June 5, 1928.  
W. T. CARLING  
1,672,673  
ONE-WAY CLUTCH UNIT FOR CHANGE SPEED GEARS  
Filed Aug. 7, 1926  2 Sheets-Sheet 1
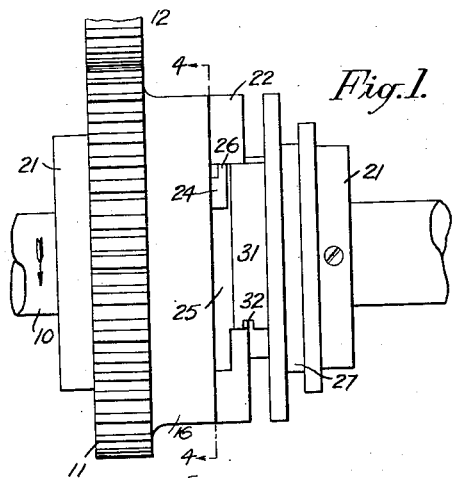
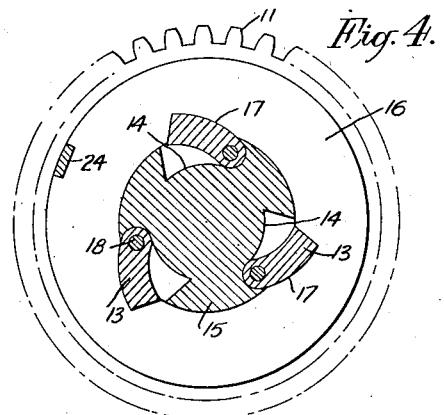
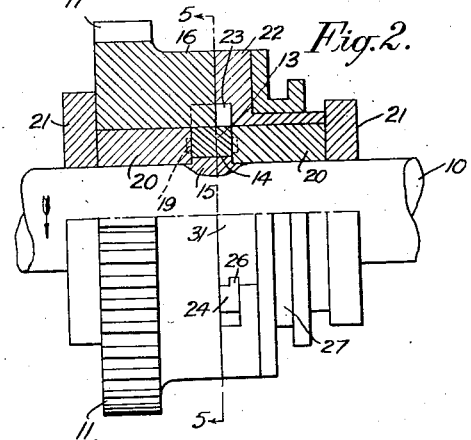
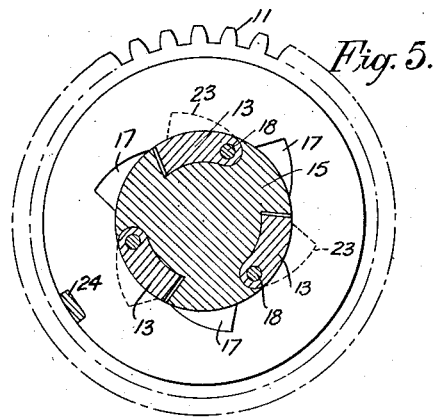
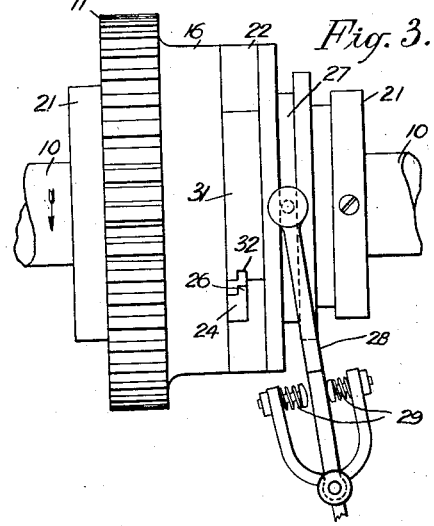
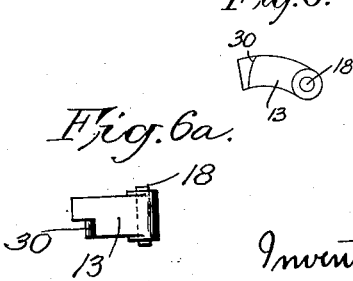
Inventor:—
William T. Carling,
By:— Smith & Michael,
Attorneys.

June 5, 1928.
W. T. CARLING
1,672,673
ONE-WAY CLUTCH UNIT FOR CHANGE SPEED GEARS
Filed Aug. 7, 1926 2 Sheets-Sheet 2
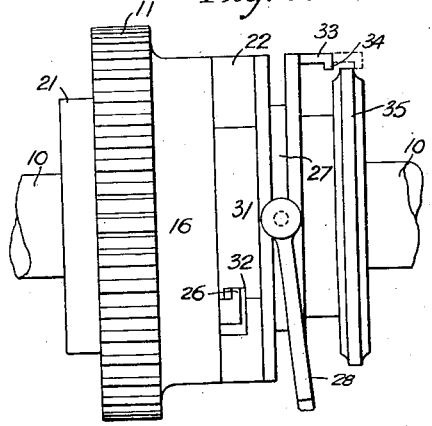
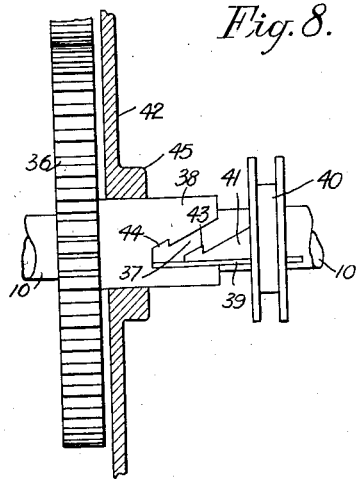
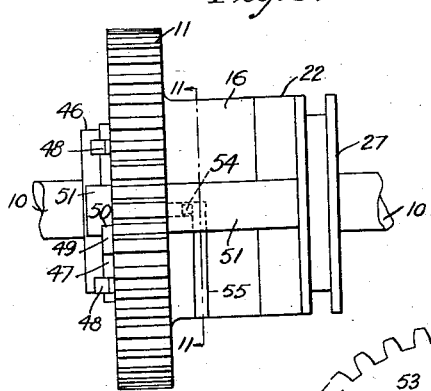
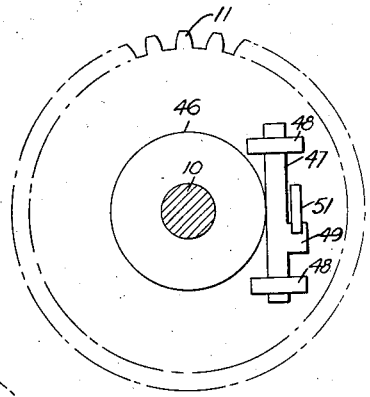

Patented June 5, 1928.

1,672,673

UNITED STATES PATENT OFFICE.

WILLIAM THOMAS CARLING, OF GUILDFORD, ENGLAND.

ONE-WAY CLUTCH UNIT FOR CHANGE-SPEED GEARS.

Application filed August 7, 1926, Serial No. 127,913, and in Great Britain August 7, 1925.

This invention relates to variable speed gears employing constant-mesh gears in conjunction with one-way clutch units for the several gears; it is more particularly intended for use in the change speed gears of automobiles but may be applied to other machinery for which it is suitable.

The invention has for its main object to provide in improved clutch unit so as to allow not only the normal operation of the one-way clutch in transmitting the power and when the driven member overruns the driving member, but also the inverse operation, as when the driving member overruns the driven member under certain conditions. For example in the case of a three-speed gear, with the middle gear in operation, the one-way clutch of the low gear can allow its driven member to overrun, while the clutch of the high gear can at the same time allow its driving member to overrun.

A second object of the invention is to provide a clutch unit which will prevent the shock to the parts of the change speed gear which is usually occasioned if the one-way clutch is brought into operation at a time when the driving member is over-running the driven member.

The invention has also for its object to provide an improved one-way clutch unit fitted with a rotatable element which while rotating with the clutch member attached to one of the shafts to be connected is yet capable of limited angular displacement relatively to said member and replacement or restoration in normal relation, which angular displacement prevents the clutch being engaged, the displacement and replacement being effected by friction between the rotatable element and a surface rotating with the other of the members to be connected.

A further object of the invention is the provision of means for causing said angular displacement and replacement of the rotatable element of the clutch unit to take place automatically when one shaft which has been running slower (or faster) changes this condition and commences to run faster (or slower), together with the provision of means whereby the clutch can be fixed in the free position by the operator.

Another object of the invention is the provision of means whereby the control mechanism of the clutch unit, is locked if at the time when the gear-change is about to be effected the driving member is overrunning the driven member of the clutch, the locking of the control mechanism being maintained until this condition is reversed.

The invention comprises the improved construction and arrangement of parts hereafter described with reference to the accompanying drawings, in which:—

Figure 1 is an elevation of a gear clutch controlling one of the trains of a change speed gear, showing the clutch in the position for transmitting the drive through this train of gears.

Figure 2 is an elevation, with the upper half in section, and showing the control mechanism locked, the clutch being free with the driving shaft overrunning the driven gear.

Figure 3 is an elevation showing the control mechanism unlocked, in the position when the driving shaft is running slower than the driven gear.

Figure 4 is a section on the line 4—4 of Figure 1.

Figure 5 is a section on the line 5—5 of Figure 2.

Figure 6 represents one of the driving dogs of the one-way clutch.

Figure 6ª is a plan view thereof.

Figure 7 is an elevation of a modified form of clutch hereafter described.

Figure 8 is an elevation, partly in section, showing the application of the invention to a compound epicyclic gear of known type.

Figure 9 is an elevation of a gear clutch with a modified form of locking mechanism.

Figure 10 is a side elevation of the same.

Figure 11 is a detail in section on the line 11—11 of Figure 9.

Referring to Figures 1 to 6, the driving shaft 10 supports the driven gear 11, which engages a second gear 12, the two gears 11, 12 forming one of the trains of a change speed gear. The gear 11 is rotatable in relation to the shaft 10, but can be coupled thereto so as to receive the driving torque, by means of dogs 13 engaged in suitably shaped pockets or recesses 14 at the periphery of a ring or collar 15 integral with the shaft 10.

The gear 11 has a hub 16 extending partly over the collar 15, the part surrounding the collar being formed with pockets 17 adapted to be engaged by the dogs 13 in the driving position (Figure 4). The dogs 13 are provided at one end with pivotal pins or trunnions 18 which engage in corresponding recesses 19 in the sleeves 20, both of which sleeves are fixed in relation to the shaft 10, by collars 21 which clamp the sleeves 20 against the collar 15. The gear 11 is freely rotatable upon one of the sleeves 20, but under the action of centrifugal force, the dogs 13 tend to move outwards upon their pivots 18, so as to bring their other ends into driving engagement with the pockets 17 of the gear hub 16, thereby transmitting the drive to the gear 11.

Upon the other sleeve 20 there is mounted a loose clutch element 22 capable of limited angular displacement in relation to the gear hub 16. This clutch element 22 extends partly over the collar 15 so as to abut against the hub 16, and its part surrounding the collar is formed with pockets 23 similar to the pockets 17 but preferably of narrower width; the combined width of a pair of pockets 17, 23 is substantially equal to the width of a dog 13. In the driving position, the dogs 13 engage in both sets of pockets 17, 23, but when the clutch member 22 is displaced angularly in relation to the gear 11 the two sets of pockets are moved out of register and the dogs are prevented from engagement. In this position (Figure 5) the clutch is free, and either member can overrun without the dogs 13 clicking in and out of the pockets, as in an ordinary one-way clutch; noise and wear are thereby obviated. As shown in Figure 6, the dogs 13 are cut away at 30 near the driving end on the side which enters the pockets 23 in the loose clutch element 22, so as to allow the dogs to enter gradually into engagement as the pockets 17, 23 come into register.

The angular displacement of the clutch member 22 relative to the gear 11 is limited by a stop piece 24 upon the face of the hub 16, this stop piece working in a part-circular channel 25 in the loose clutch element 22. The channel 25 is formed in the periphery of the clutch element 22, across the entire width of the latter, for a radial depth sufficient to accommodate the stop-piece 24, and for an angular extent corresponding to the maximum relative displacement of the members 16, 22, one end of the channel being undercut or rabbeted to allow the stop-piece 24 to pass clear of the open portion of the channel as seen in Figure 3. The stop piece 24 has a cranked finger 26 forming part of the locking mechanism hereafter described.

Upon the loose clutch element 22, there is slidably mounted a collar 27 adapted to be actuated by a striking fork 28 operated through spring connections 29. The collar 27 has a lateral projection 31 entering the open portion of the channel 25 in the loose clutch element 22; all these parts have the same angular displacement relatively to the gear hub 16, but the collar 27 and projection 31 have an additional sliding movement in relation to the clutch element 22 without it being possible to withdraw the projection 31 wholly from the channel 25. One face of the projection 31 has a notch 32 with which the cranked finger 26 of the stop-piece 24 is adapted to engage, the engagement of these parts (see Figure 2) providing the locking effect for preventing the engagement of the clutch so long as the driving member is overrunning the driven member. The clutch can therefore be engaged only when the driving member is rotating at a speed less than that of the driven member.

It will be noted that the position of the parts 24, 26 and 32 of the locking mechanism corresponds to the rotation of the driving shaft 10 in the direction indicated by the arrows in Figures 1 to 3; obviously the arrangement would have to be modified in the case of a shaft running in the opposite direction.

When used in automobile change speed gears, for example, the invention may utilize the system of engine control according to my British Patent No. 234,238, dated April 4th, 1924, which provides for the automatic reduction of the fuel supply to the engine as a first step in gear changing. Other equivalent or suitable means may however be employed for momentarily releasing the driving torque or slowing down the driving member in order to permit the change of gear.

Assume now that the gear train 11, 12 represents a gear which is to be engaged, when a lower gear has been disconnected. The driving shaft 10 will be overrunning the gear 11, and the slidable collar will be in the position shown in Figure 2. The first movement of the gear shift lever reduces the supply of fuel and therefore the speed of the engine as already stated. At the same time spring pressure is applied to the striking fork for the collar 27, tending to withdraw the projection 31, but the finger 26, being engaged in the notch 32, resists the sliding motion of the collar 27 and thereby prevents such withdrawal until the speed of the driving shaft 10 falls slightly below that of the gear 11. When this happens, the gear 11 moves forwards relatively to the shaft 10, from the position of Fig. 2 to that of Fig. 3, and the finger 26 comes automatically out of the notch 32, whereupon the spring pressure immediately causes the withdrawal of the projection 31. The dogs 13 can then engage as soon as the pockets 17, 23 come into register, so as to take up the drive, the position of the parts being as in Figure 1.

In changing down from the gear train 11, 12 to a lower gear, the speed of the engine is first reduced as above explained and spring pressure is applied to the collar 27 in the left-hand direction. As soon as the gear 11 commences to overrun the driving shaft 10, the stop piece 24 takes up the position shown in Figure 3, the clutch element 22 being retarded or displaced angularly by its friction upon the slower running sleeve 20, the spring pressure on the collar 27 then replaces the projection 31 in the channel 25, as seen in Figure 3. This gear train therefore ceases to drive, and the next lower gear is brought into operation.

Figure 7 illustrates a modification in which controlling friction is applied to the locking mechanism after the start of the operation for changing gear, and is removed when the change has been effected, such additional applied friction not being continuous during the whole of the time that the shaft is running. The arrangement is similar to Figures 1 to 5, with the exception that the collar 27 is formed with an overhanging lateral arm 33 having a rib 34 adapted to come into frictional engagement with the periphery of a disc 35 fixed on the driving shaft 10, and the notch 32 in the projection 31 has sufficient play in relation to the finger 26 to allow some sliding movement before the rib 34 makes contact with the disc 35; also by the time the finger 26 is withdrawn to its fullest extent, the rib 34 (as shown in dotted lines) has ceased to make contact with the disc 35.

Figure 8 shows the application of the invention to a compound epicyclic gear constructed according to my United States Patent No. 1,486,565, dated 11th March, 1924. In this arrangement the backlash in the unlocking gear 36 can be provided by cutting a taper keyway 37 in its hub 38, the keyway at its narrowest part being considerably wider than the key 39 which is fixed to the driving shaft 10. A sliding sleeve 40 mounted upon the driving shaft for the sun-gear 36 has an extension 41 of tapered form which when the gears are locked in the manner described in said specification to transmit the drive, just enters the taper keyway 37; in this position there is sufficient backlash in the unlocking sun and planet gears to cause them to lock. When the extension is pushed home in the keyway 37, the backlash is taken up in the unlocking sun-gear 36 to such an extent that its teeth come into driving contact with those of its planet pinion, with the result that the compound epicyclic train of gears is unlocked, and the driving shaft 10 can rotate independently of the planet housing 42. In order to prevent the extension 41 being withdrawn while the shaft 10 is overrunning the driven member, there is provided a tooth 43 integral with the extension 41, which then enters a notch 44 in the side of the taper keyway 37 and thus prevents its withdrawal. Immediately the planet housing overruns the driving shaft 10, the tooth 43 comes out of the notch 44 and the extension 41 can be withdrawn. The unlocking sun gear 36 is caused to make the necessary angular displacement by reason of the friction between its hub 38 and the boss 45 of the planet housing.

Figures 9 to 11 illustrate means for locking the control mechanism, in which the locking friction takes place between a collar or disc 46 fixed upon the driving shaft 10 and a tangentially slidable locking bolt 47 mounted in supports 48 upon the side of the gear 11. A tongue 49 upon the bolt is adapted to engage a notch 50 in a finger 51 attached to the collar 27, such engagement being maintained by the friction of the disc 46 against the bolt 47 until the gear 11 overruns the shaft 10, whereupon the bolt 47 withdraws its tongue 49 from the notch 50 in the finger and allows the collar 27 to slide towards the right, as viewed in Figure 9. The projection 51, which extends from the collar 27 through a part-circular slot 52 in the web 53 of the gear 11 has on its inner side a lug 54 (see Figure 11) which engages in an L-shaped channel 55 in the gear hub 16; the shorter branch of said channel allows the sliding movement of the lug 54 along with the collar 27, and the longer branch of the channel allows the rotational movement of the lug 54 during the angular displacement of the clutch element 22. In Figures 9 to 11 the parts are shown in the free position, the driving dogs being arranged in a similar manner to those of the clutch illustrated in Figures 1 to 6.

What I claim is:—

1. In control mechanism for change speed gears employing constant mesh gears and one-way clutches, a clutch comprising driving and driven members with interengaging uni-directional power-transmitting means thereon, means for controlling the interengagement of said power-transmitting means, and additional means for locking said controlling means, said locking means operative to prevent interengagement of said power transmitting means so long as said driving member is rotating faster than said driven member.

2. In control mechanism for change speed gears employing constant mesh gears and one-way clutches, a clutch comprising driving and driven members with interengaging means thereon, means for controlling said interengaging means, said controlling means consisting of a clutch element rotating with one of said members but capable of limited angular displacement relative thereto, and additional means for locking said controlling means, and locking means operative to prevent engagement of said members so long as said driving member is rotating faster than said driven member.

3. In control mechanism for change speed gears employing constant mesh gears and one-way clutches, a clutch comprising driving and driven members with interengaging uni-directional power-transmitting means thereon, a clutch element rotating with one of said members but capable of limited angular displacement relative thereto, said clutch element having also frictional engagement with the other of said members, said clutch element in one limiting position preventing the engagement of said power transmitting means, means for retaining said clutch element in said position, said clutch element in the other limiting position allowing the engagement of said power-transmitting means, said clutch element being displaced automatically from one to the other of said limiting positions by said frictional engagement, and means for locking said retaining means so long as said driving member rotates faster than said driven member.

4. In control mechanism for change speed gears employing constant mesh gears and one-way clutches, a clutch comprising driving and driven members with interengaging uni-directional power-transmitting means thereon, a clutch element rotating with one of said members but capable of limited angular displacement relative thereto, said clutch element having also frictional engagement with the other of said members, said clutch element in one limiting position preventing the engagement of said power-transmitting means, means for retaining said clutch element in said position, said clutch element in the other limiting position allowing the engagement of said power-transmitting means, said clutch element being displaced automatically from one to the other of said positions by said frictional engagement, means for applying additional friction to assist the movement of said clutch element from one limiting position to the other at a period during the operation of changing gear, and means for locking said retaining means so long as said driving member rotates faster than said driven member.

5. In control mechanism for change speed gears employing constant mesh gears and one-way clutches, a clutch comprising driving and driven members with interengaging uni-directional power-transmitting means thereon, a clutch element rotating with one of said members but capable of limited angular displacement relative thereto and having also frictional engagement with the other of said members, said clutch element in one limiting position preventing the engagement of said power-transmitting means, said clutch element in the other limiting position allowing the engagement of said power-transmitting means, said clutch element being displaced automatically from one to the other of said positions by said frictional engagement, an axially displaceable collar rotating with said clutch element, a projection on said collar acting at one end of its travel to retain said clutch element in the position preventing engagement of said power-transmitting means, and a locking device upon said driven member, said locking device co-operating with said projection to prevent reverse travel of said collar so long as said driving member is overrunning said driven member.

6. In a change speed mechanism comprising constant mesh gears working in conjunction with one-way clutches, the combination of a clutch including driving and driven members, with interengaging power-transmitting means thereon, a clutch element rotating with but capable of a limited angular displacement in relation to one of said clutch members, said clutch element by such angular displacement controlling the engagement of said power-transmitting means, means for maintaining said clutch element in the displaced position corresponding to the disengagement of said power transmitting means, and means for locking said maintaining means in operation so long as said driving member is overrunning said driven member.

7. In a change speed mechanism, the combination of a driving member, ratchet pawls upon said driving member, a driven member adapted to be driven by said pawls in one direction of rotation, a rotary element capable of limited angular displacement relatively to said driven member, said rotary element adapted when displaced to ride over said pawls and hold them from engagement with said driven member, means for displacing said rotary element by friction with said driving member, and means for locking said rotary element in displaced position so long as said driving member tends to rotate said rotary element faster than said driven member.

In testimony whereof I hereunto affix my signature.

WILLIAM THOMAS CARLING.